United States Patent
Sakato et al.

(10) Patent No.: US 11,317,016 B2
(45) Date of Patent: Apr. 26, 2022

(54) IMAGE PROCESSING DEVICE, CONTROL METHOD THEREOF, IMAGING DEVICE, AND RECORDING MEDIUM

(71) Applicant: CANON KABUSHIKI KAISHA, Tokyo (JP)

(72) Inventors: Kazuma Sakato, Kanagawa (JP); Yohei Horikawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/162,855

(22) Filed: Jan. 29, 2021

(65) Prior Publication Data

US 2021/0243379 A1   Aug. 5, 2021

(30) Foreign Application Priority Data

Feb. 3, 2020   (JP) .............................. JP2020-016300

(51) Int. Cl.
  *H04N 5/232*   (2006.01)
  *G06T 5/40*    (2006.01)
(52) U.S. Cl.
  CPC ......... *H04N 5/232127* (2018.08); *G06T 5/40* (2013.01); *H04N 5/23225* (2013.01); *H04N 5/232125* (2018.08)
(58) Field of Classification Search
  CPC ....... H04N 5/232127; H04N 5/232125; H04N 5/23225; H04N 5/232935; H04N 5/23296; H04N 5/232945; H04N 5/23216; H04N 5/232122; G06T 5/40
  USPC ....................................................... 348/345
  See application file for complete search history.

(56) References Cited

U.S. PATENT DOCUMENTS

| | | | | |
|---|---|---|---|---|
| 9,854,149 B2* | 12/2017 | Matsuyama | ..... | H04N 5/232945 |
| 10,298,853 B2* | 5/2019 | Yamaguchi | ........ | H04N 5/23245 |
| 11,004,229 B2* | 5/2021 | Ishibashi | .............. | H04N 13/239 |
| 11,080,873 B2* | 8/2021 | Sasaki | ....................... | G06T 7/50 |
| 2014/0354781 A1* | 12/2014 | Matsuyama | ..... | H04N 5/232935 |
| | | | | 348/49 |
| 2015/0181196 A1* | 6/2015 | Izawa | ................ | H04N 5/36961 |
| | | | | 348/46 |
| 2017/0200283 A1* | 7/2017 | Yamaguchi | ........ | H04N 5/23245 |
| 2018/0285661 A1* | 10/2018 | Amano | .................... | G08G 1/16 |
| 2019/0096079 A1* | 3/2019 | Ishibashi | .............. | H04N 13/239 |

(Continued)

FOREIGN PATENT DOCUMENTS

JP    2019-070822 A    5/2019

*Primary Examiner* — Pritham D Prabhakher
(74) *Attorney, Agent, or Firm* — Cowan, Liebowitz & Latman, P.C.

(57) ABSTRACT

An imaging device acquires a plurality of viewpoint image signals having different viewpoints from an imaging element. The imaging device selects a subject region within a captured image, and divides the subject region into a plurality of regions. The imaging device performs a correlation operation for each divided region, and calculates an amount of parallax on the basis of one or more extreme positions. In addition, the imaging device calculates distance information of a subject on the basis of the amount of parallax, and calculates a reliability for the distance information. If there are two or more pieces of distance information which are output in the divided region, the imaging device generates a distance histogram using the two or more pieces of distance information based on the reliability.

14 Claims, 12 Drawing Sheets

(56) References Cited

U.S. PATENT DOCUMENTS

2019/0120950 A1* 4/2019 Tanaka .................... G02B 7/34
2019/0355246 A1* 11/2019 Suzuki ................ G08G 1/0175
2020/0013175 A1* 1/2020 Sasaki .................... G06T 5/002
2020/0211212 A1* 7/2020 Ishibashi .................. G06T 7/11

* cited by examiner

IMAGE PROCESSING DEVICE, CONTROL METHOD THEREOF, IMAGING DEVICE, AND RECORDING MEDIUM

BACKGROUND OF THE INVENTION

Field of the Invention

The present invention relates to an image processing technique of calculating a histogram representing a frequency distribution of distance information corresponding to a subject.

Description of the Related Art

An Imaging devices such as a digital camera or a video camera detects a subject region within an image through template matching or a user's touch panel operation on the basis of a video signal. Autofocus (hereinafter also referred to as AF) control is performed on the detected subject region. If an image of a subject other than the main subject is included in the subject region, there is a possibility of a subject targeted by a user being out of focus.

An imaging device disclosed in Japanese Patent Laid-Open No. 2019-70822 analyzes distance information within a subject region and generates a distance histogram representing a frequency distribution of the distance information. AF control is performed by determining whether a plurality of subjects are present in the subject region on the basis of the distance histogram.

In the technique disclosed in Japanese Patent Laid-Open No. 2019-70822, in order to calculate the frequency of the distance information, the subject region is divided into a plurality of regions, and a process of adding one piece of distance information to the frequency for each divided region is performed. However, if images of a plurality of subjects are present in the divided region, only one piece of distance information of a plurality of subjects is reflected in the distance histogram. For this reason, if AF control is performed on the basis of a distance histogram with low accuracy, there is a possibility of the accuracy of AF control being influenced.

SUMMARY OF THE INVENTION

The present invention provides an image processing device capable of calculating a more accurate distance histogram.

According to an embodiment of the present invention, there is provided an image processing device including: an acquisition unit configured to acquire a plurality of image signals having different viewpoints; a division unit configured to divide a region within an image into a plurality of regions; a parallax amount calculation unit configured to calculate an amount of parallax by performing a correlation operation of the plurality of image signals with respect to a plurality of divided regions divided by the division unit; a distance calculation unit configured to calculate distance information of a subject based on the amount of parallax; a reliability calculation unit configured to calculate a reliability which is an index for the distance information in the correlation operation; and a generation unit configured to generate a histogram representing a frequency distribution of the distance information, wherein, if a plurality of pieces of the distance information are present in the divided regions, the generation unit generates the histogram using the plurality of pieces of distance information and the reliability.

Further features of the present invention will become apparent from the following description of exemplary embodiments with reference to the attached drawings.

DESCRIPTION OF THE EMBODIMENTS

Hereinafter, embodiments of the present invention will be described in detail with reference to the accompanying drawings. The embodiments show an example of an imaging device including an image processing device that calculates a histogram representing the frequency distribution of distance information for recognizing a subject. Meanwhile, the distance information is depth information indicating the depth of a subject within a captured image in a depth direction, and includes a depth image, a depth map, or the like. Examples of the depth information capable of being used include a map of the amount of image shift which is calculated from a plurality of viewpoint images having different viewpoints, a map of the amount of defocus which is calculated by multiplying the amount of image shift by a predetermined conversion coefficient, a distance map obtained by converting the amount of defocus into distance information of a subject, and the like.

First Embodiment

Figure 1:
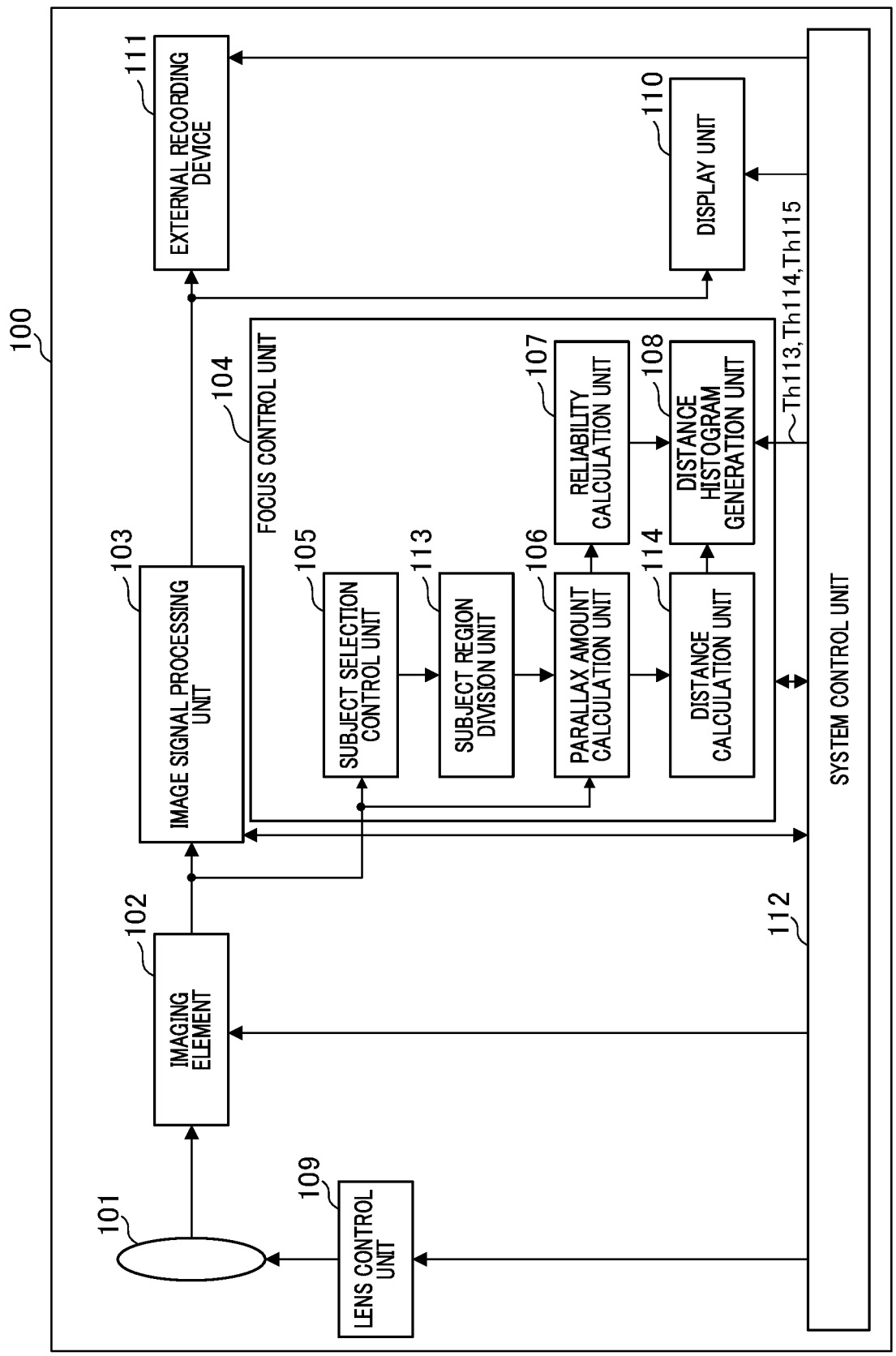
FIG. 1 is a block diagram illustrating a configuration of an imaging device in a first embodiment.

FIG. 1 is a block diagram illustrating a configuration example of an imaging device 100 according to the present embodiment. The imaging device 100 includes a lens unit 101, an imaging element 102, an image signal processing unit 103, a focus control unit 104, a lens control unit 109, a display unit 110, an external recording device 111, and a system control unit 112.

The lens unit 101 includes a lens group, a shutter, a diaphragm, and the like constituting an imaging optical system, and forms an optical image on the imaging element 102. The lens group includes a zoom lens or a focus lens, and is driven and controlled by the lens control unit 109. The lens control unit 109 performs various types of control on the lens unit 101 in accordance with a command of the system control unit 112. In focus control, a focal position is adjusted by driving and controlling the focus lens constituting the imaging optical system.

The imaging element 102 has a configuration in which a complementary metal oxide film semiconductor (CMOS) sensor or the like is used, and a plurality of unit pixel cells are arrayed in a two-dimensional matrix. The imaging element 102 performs photoelectric conversion on a light image formed by the lens unit 101, and outputs an electrical signal. The configuration of the imaging element 102 will be described later with reference to FIGS. 2A to 2C.

The image signal processing unit 103 performs image processing on an image signal acquired from the imaging element 102. The image processing is gamma correction, color separation, white balance adjustment, or the like, and a captured image signal is generated by known signal processing. The captured image signal on which signal processing is performed is output to the external recording device 111 and the display unit 110.

The focus control unit 104 includes a subject selection control unit 105, a subject region division unit 113, a parallax amount calculation unit 106, a distance calculation unit 114, a reliability calculation unit 107, and a distance histogram generation unit 108. The focus control unit 104 performs focus adjustment control on the imaging optical system together with the system control unit 112 and the lens control unit 109.

The subject selection control unit 105 acquires an image signal from the imaging element 102, and detects and selects a subject region within an image using a technique such as template matching. The subject selection control unit 105 outputs region information of the subject region within the image to the subject region division unit 113 on the basis of the result of detection of the subject.

The subject region division unit 113 performs a process of dividing the subject region selected by the subject selection control unit 105 at a predetermined ratio. The number of divisions is a fixed value or a variable value which is changed in accordance with the size of the subject region. The subject region division unit 113 outputs region information of the divided regions to the parallax amount calculation unit 106.

The parallax amount calculation unit 106 acquires the image signal from the imaging element 102 and the region information of the divided regions from the subject region division unit 113, and calculates the amount of parallax related to each image signal with respect to each divided region.

The distance calculation unit 114 acquires the amount of parallax calculated by the parallax amount calculation unit 106, and calculates information on a distance from the imaging optical system to the subject. A method of calculating a distance using the imaging element 102 will be described later with reference to FIG. 4.

The reliability calculation unit 107 calculates the reliability of the distance calculation result in the distance calculation unit 114. The reliability is, for example, an index representing the reliability of a correlation operation result, and is calculated using the gradient of the correlation operation result in the parallax amount calculation unit 106.

The level of reliability is determined in accordance with an amount which is defined as an index. The reliability will be described later with reference to FIGS. 5A to 6B.

The distance histogram generation unit 108 acquires the distance information of the subject from the distance calculation unit 114 and information on the reliability from the reliability calculation unit 107. The distance histogram generation unit 108 accumulates the distance information for each region divided by the subject region division unit 113 to calculate a frequency distribution on the basis of the distance information and the reliability, and generate a distance histogram. The system control unit 112 sets thresholds (Th113, Th114, and Th115) for determination of the reliability and the number of divisions to be described later with respect to the distance histogram generation unit 108.

The display unit 110 includes a display device such as a liquid crystal display or an organic electro-luminescence (EL) display. The display unit 110 displays a video corresponding to the image signal transmitted from the image signal processing unit 103 or an operation screen (such as a menu screen) of the imaging device 100.

The external recording device 111 performs a process of recording the image signal which is input from the image signal processing unit 103 in a memory card (such as an SD card). A recording medium is a recording medium that can be attached to and detached from the imaging device 100 or a recording medium built into the imaging device 100.

The system control unit 112 includes a central processing unit (CPU), and controls the entire imaging device. The system control unit 112 controls the zoom lens, the focus lens, the diaphragm, or the like through the lens control unit 109 on the basis of imaging information obtained from an imaging scene, an imaging mode, or the like. Driving information of the imaging optical system and driving information such as the exposure period or signal readout interval of the imaging element 102 are output from the system control unit 112 to the lens control unit 109 and the imaging element 102. In addition, the system control unit 112 performs focus adjustment control by outputting driving information of the focus lens to the lens control unit 109 on the basis of focus detection information obtained by the parallax amount calculation unit 106.

Figure 2A:
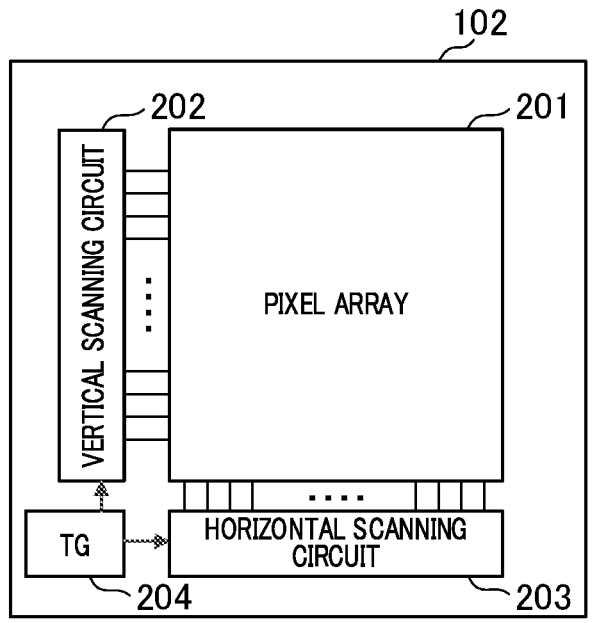
FIGS. 2A to 2C are configuration diagrams of an imaging element.
Figure 2B:
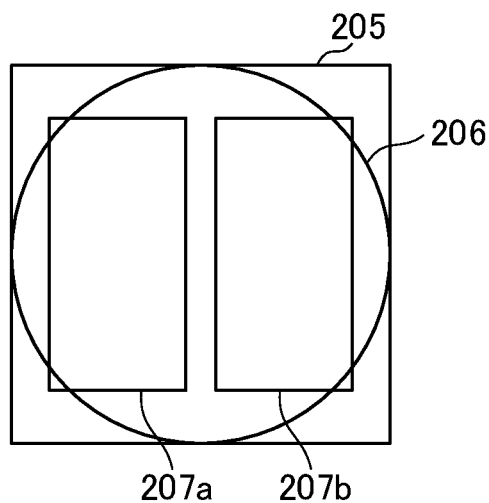
Figure 2C:
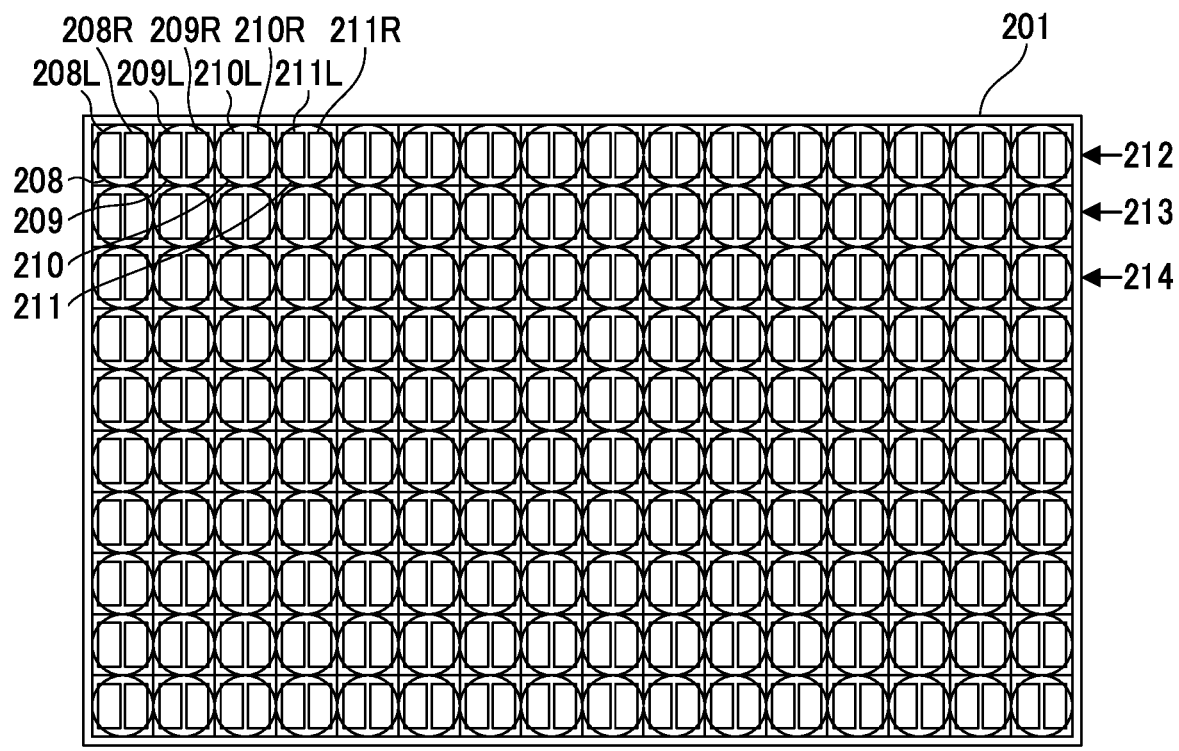

FIGS. 2A to 2C are diagrams schematically illustrating a configuration of the imaging element 102 according to the present embodiment and a layout of a pixel unit. FIG. 2A is a diagram illustrating a configuration of the imaging element 102. A pixel array 201 of the imaging element 102 is a two-dimensional matrix-like array composed of a plurality of unit pixel cells 205. FIG. 2B shows a unit pixel cell 205. A vertical scanning circuit 202 transmits a signal which is output from the unit pixel cell 205 at an end timing of an imaging period to a vertical transmission line. A horizontal scanning circuit 203 sequentially outputs an accumulated signal to the outside through an output transmission line. A timing generator (TG) 204 generates a timing signal such as an imaging period or a transmission period and transmits the generated signal to the vertical scanning circuit 202 and the horizontal scanning circuit 203.

As shown in FIG. 2B, one unit pixel cell 205 in the imaging element 102 includes one microlens 206 and a pair of photoelectric conversion units 207a and 207b. The first photoelectric conversion unit 207a and the second photoelectric conversion unit 207b perform pupil division on light fluxes passing through pupil regions different from each other in an exit pupil of the imaging optical system through the common microlens 206, and output a pair of imaging signals through photoelectric conversion. The pair of imaging signals are a plurality of viewpoint image signals having different viewpoints (image signals having a parallax).

FIG. 2C is a diagram illustrating the pixel array 201 of the imaging element 102. The imaging element 102 has a configuration which the plurality of unit pixel cells 205 are arranged in a two-dimensional array in a row direction and a column direction in order to provide a two-dimensional image signal. Each of unit pixel cells 208, 209, 210, and 211 has the same configuration as the unit pixel cell 205 shown in FIG. 2B. Photoelectric conversion units 208L, 209L, 210L, and 211L are equivalent to the first photoelectric conversion unit 207a shown in FIG. 2B. In addition, photoelectric conversion units 208R, 209R, 210R, and 211R are equivalent to the second photoelectric conversion unit 207b shown in FIG. 2B. Although an example of a unit pixel cell including a photoelectric conversion unit divided into two in a predetermined direction is shown in the present embodiment, the embodiment can be applied to an imaging element of a pixel array composed of unit pixel cells including a photoelectric conversion unit divided into three or more.

Figure 3:
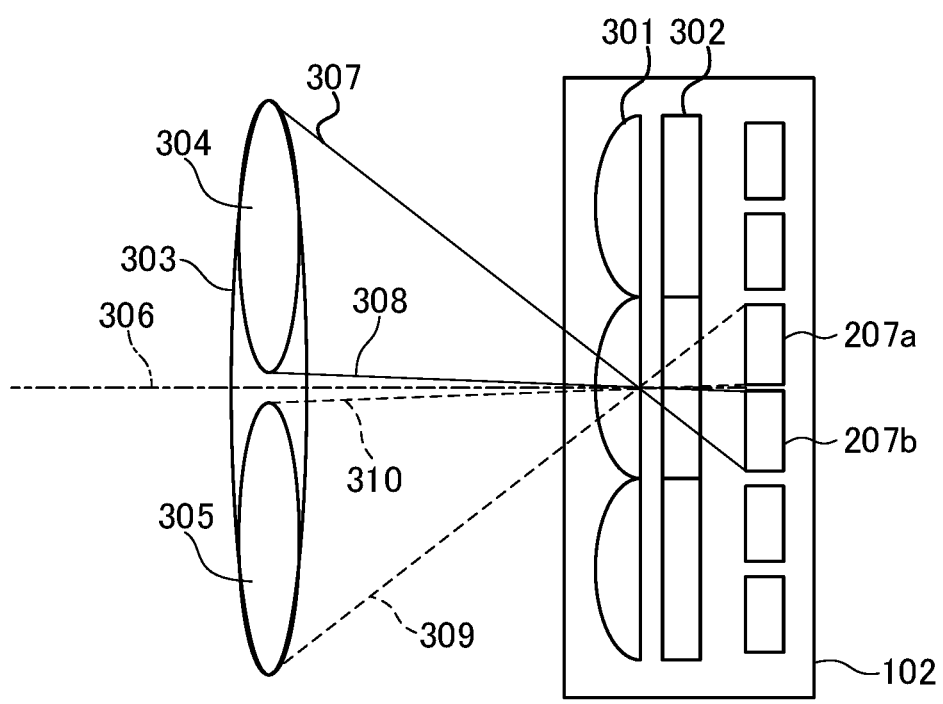
FIG. 3 is a cross-sectional view in an optical axis direction illustrating an image formation relation between optical images on the imaging element.

An image formation relation between optical images on the imaging element 102 having the pixel array 201 will be described with reference to FIG. 3. FIG. 3 is a schematic diagram conceptually illustrating a state in which a light flux emitted from an exit pupil of an imaging lens is incident on the imaging element 102, and shows a microlens 301, a color filter 302, and an exit pupil 303 of the imaging lens. An optical axis 306 is shown at the center of a light flux emitted from the exit pupil 303. Pupil partial regions 304 and 305 represent partial regions of the exit pupil 303.

Each pixel unit has the microlens 301, and light emitted from the exit pupil 303 is incident on the imaging element 102 centering on the optical axis 306. In FIG. 3, outermost circumferential beams of light 307 and 308 of a light flux passing through the first pupil partial region 304 are shown by solid lines, and outermost circumferential beams of light 309 and 310 of a light flux passing through the second pupil partial region 305 are shown by dotted lines. Among the light fluxes emitted from the exit pupil, light fluxes on the upper side of FIG. 3 with the optical axis 306 as a boundary are incident on the photoelectric conversion unit 207b as in the beams of light 307 and 308. In addition, light fluxes on the lower side of FIG. 3 are incident on the photoelectric conversion unit 207a as in the beams of light 309 and 310. That is, the first photoelectric conversion unit 207a and the second photoelectric conversion unit 207b each receive light from different regions of the exit pupil of the imaging lens. Phase difference detection is performed by utilizing such characteristics.

Next, a phase difference detection method in the present embodiment will be described with reference to FIGS. 2C and 3. In the plurality of unit pixel cells 205, the first photoelectric conversion unit 207a is used as a pixel group for an image A that performs photoelectric conversion on the image A among a pair of subject images for focus detection based on a phase difference detection scheme. In addition, the second photoelectric conversion unit 207b is used as a pixel group for an image B that performs photoelectric conversion on the image B. In the pixel array 201 of FIG. 2C, it is assumed that the pixel group for the image A that refers to outputs of the photoelectric conversion units 208L to 211L or the like is used in a row 212, and that the pixel group for the image B that refers to outputs of the photoelectric conversion units 208R to 211R or the like is used in a row 213. A phase difference signal can be acquired by performing phase difference detection through a correlation operation between a first image signal acquired from the pixel group for the image A and a second image signal acquired from the pixel group for the image B. The row 212 and the row 213 are phase difference detection pixel rows for outputting the phase difference signal to the focus control unit 104. An AF for performing focus detection based on a phase difference detection scheme using the pixel group for the image A and the pixel group for the image B provided in the imaging element 102 is referred to as an imaging surface phase difference AF.

In addition, in a row 214 shown in FIG. 2C, outputs of each of the first photoelectric conversion unit 207a and the second photoelectric conversion unit 207b constituting the unit pixel cell 205 are added. A captured image signal can be read out by the addition. The row 214 is a normal pixel row for outputting an addition signal. Meanwhile, the unit pixel cell of the normal pixel row may have a configuration in which the photoelectric conversion units are not divided and only one photoelectric conversion unit is provided.

The phase difference detection method is already known, and phase difference detection schemes other than the above may be used. For example, there is a configuration in which a light-shielding portion and pixels for focus detection are disposed below a microlens that performs pupil division. It is possible to acquire image signals of a pair of subject images by combining outputs of two types of pixels for focus detection having different opening positions of the light-shielding portion.

Figure 4:
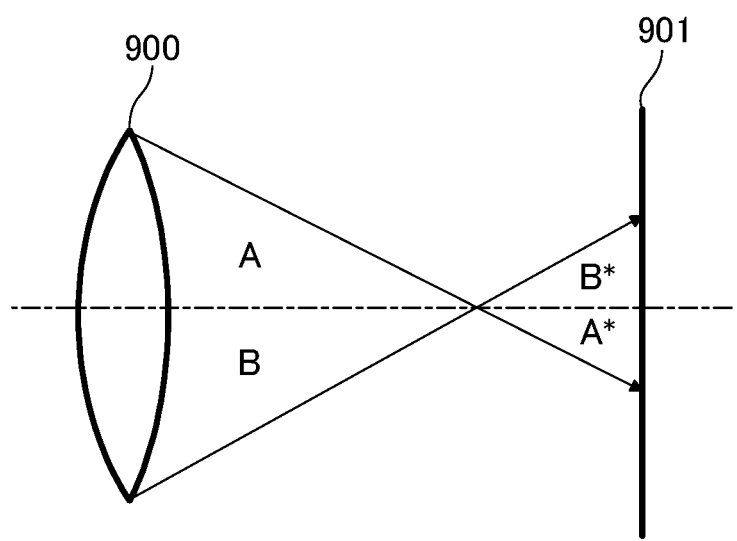
FIG. 4 is a diagram illustrating an image formation relation between an imaging lens and the imaging element.

A method of calculating a subject distance using the imaging element 102 will be described with reference to FIG. 4. In a relationship between a lens 900 representing the imaging optical system and an imaging surface 901 of the imaging element 102, if an object image is formed in front of the imaging element 102, a half-light flux A on the upper side of the exit pupil in FIG. 4 shifts to the lower side as in A* on the imaging element. In addition, a half-light flux B on the lower side of the exit pupil in FIG. 4 shifts to the upper side as in B* on the imaging element. That is, a pair of image signals formed by a light flux passing through half of the pupil region of the imaging optical system in each pixel unit become signals of which the phases are shifted in a vertical direction in FIG. 4 in accordance with the image formation state of the object image. The distance calculation unit 114 calculates the amount of defocus by obtaining the amount of parallax between two subject images from the correlation, and calculates a distance from the imaging optical system to the subject using the amount of defocus and information of the lens and the diaphragm.

Figure 5A:
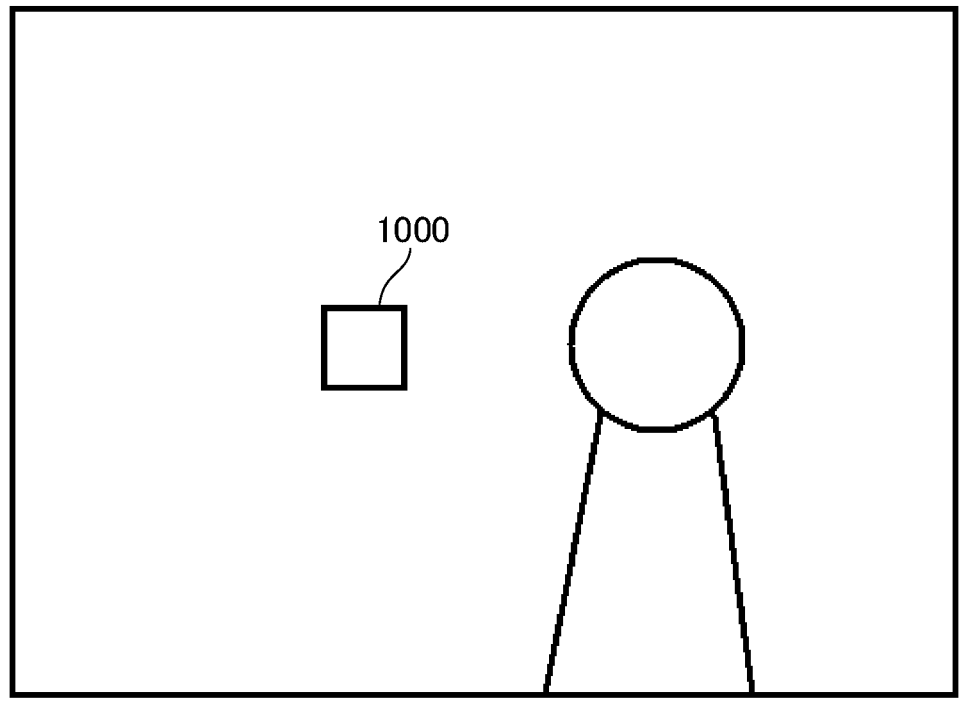
FIGS. 5A and 5B are diagrams illustrating an outline of stereo matching.
Figure 5B:
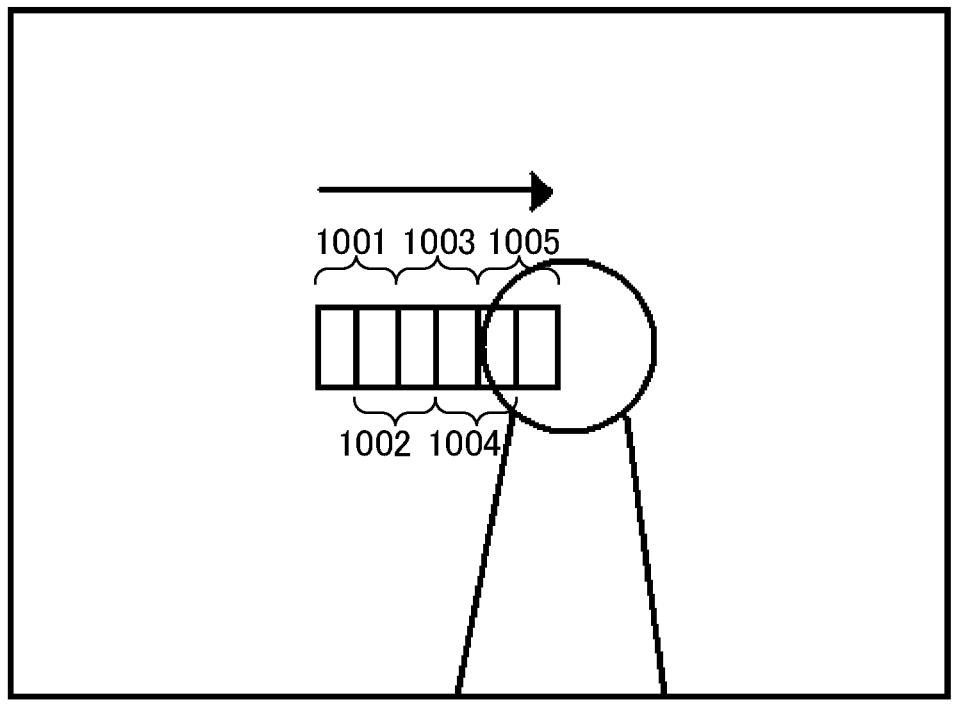

The reliability which is calculated by the reliability calculation unit 107 will be described with reference to FIGS. 5A to 6B. FIGS. 5A and 5B are diagrams illustrating a process of calculating the amount of image shift from a pair of different image signals having a phase difference. FIG. 5A represents a standard image, and FIG. 5B represents a reference image. The parallax amount calculation unit 106 performs a correlation operation while performing a relative sequential shift operation on a correlation operation region 1000 of the standard image and correlation operation regions 1001 to 1005 of the reference image. A correlation operation evaluation value for each number of shifts is calculated by arithmetically operating a difference between the luminance values of pixels present at the same position within a correlation operation region and obtaining the sum of differences between the luminance values of all the pixels within the region. If an image included in the correlation operation region of the standard image and an image included in the correlation operation regions of the reference image completely coincide with each other, the correlation operation evaluation value is set to zero. That is, a pixel position of the number of shifts in which the correlation operation evaluation value is minimized becomes a corresponding point in the reference image.

Figure 6A:
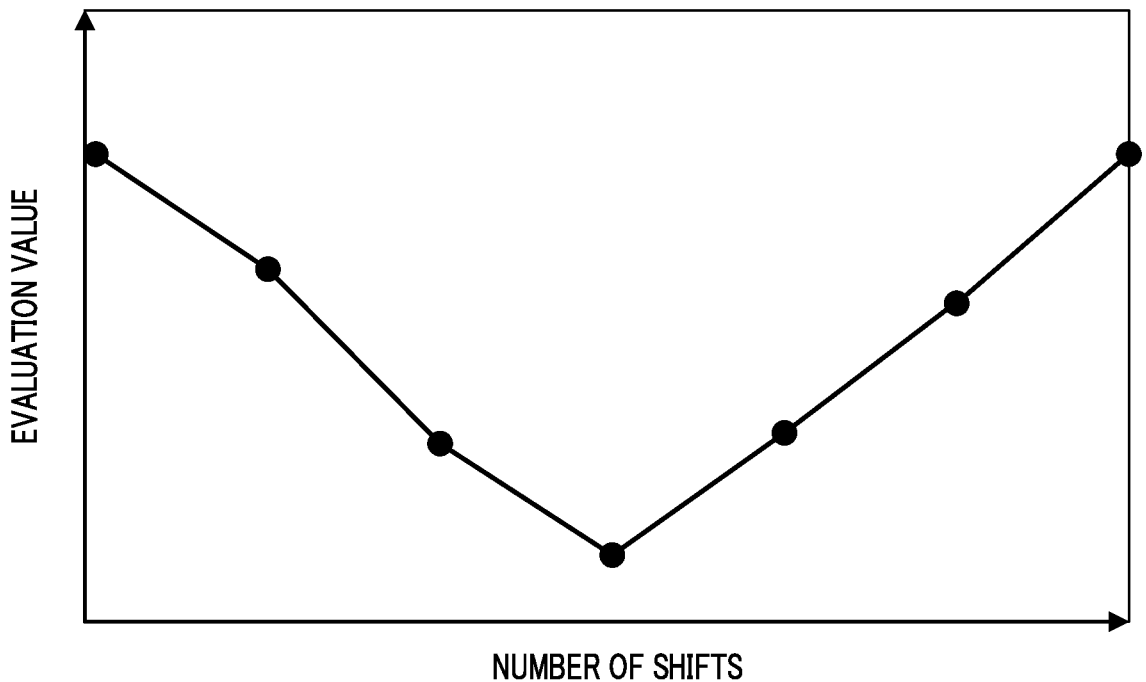
FIGS. 6A and 6B are lines graph obtained by plotting evaluation values of distance calculation.
Figure 6B:
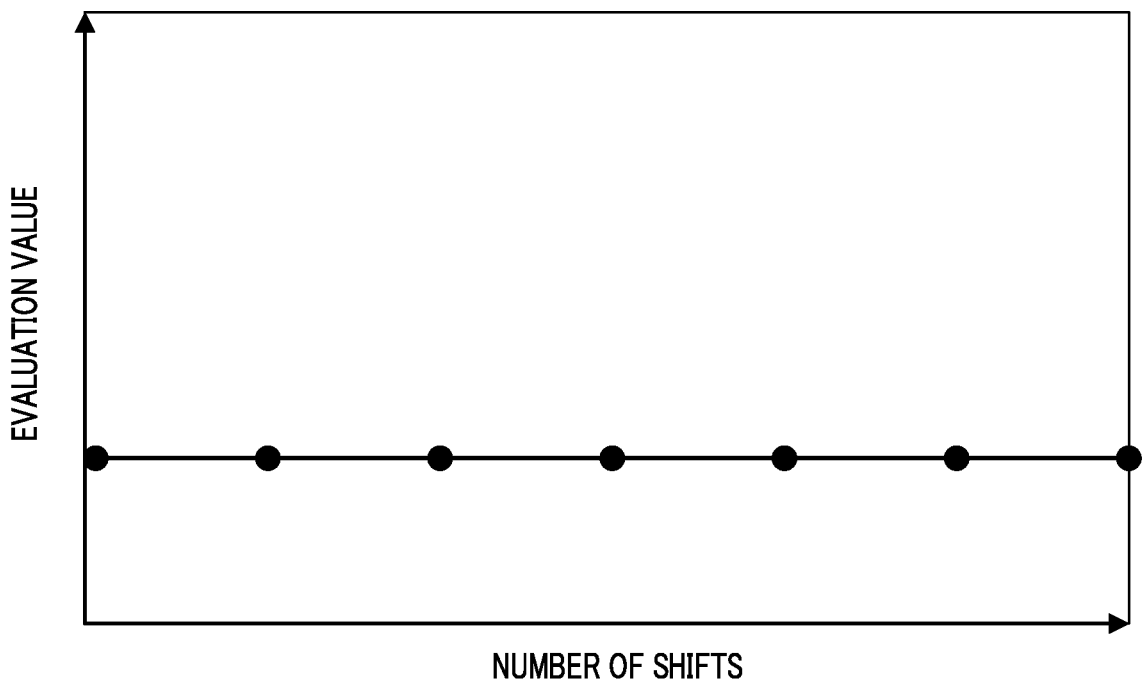

FIGS. 6A and 6B are graphs obtained by plotting correlation operation evaluation values of the correlation operation region of the standard image and the correlation operation region of the reference image. The horizontal axis represents the number of shifts, and the vertical axis represents a correlation operation evaluation value. FIG. 6A shows a correlation operation result in a case where the reliability is determined to be high. In FIG. 6A, the correlation operation evaluation value changes for each number of shifts, and the number of shifts in which the correlation operation evaluation value is set to a minimum value, that is, a corresponding point, can be uniquely obtained. In this case, the reliability calculation unit 107 determines that the reliability is high. On the other hand, FIG. 6B shows a correlation operation result in a case where the reliability is determined to be low. FIG. 6B shows a case in which a correlation operation is performed on a region with no change in luminance, and the correlation operation evaluation value is constant with respect to each number of shifts. For this reason, a corresponding point cannot be uniquely obtained, and the reliability calculation unit 107 determines that the reliability is low. The reliability calculation unit 107 calculates the reliability on the basis of the amount of change in the correlation operation evaluation value for the number of shifts.

Figure 7:
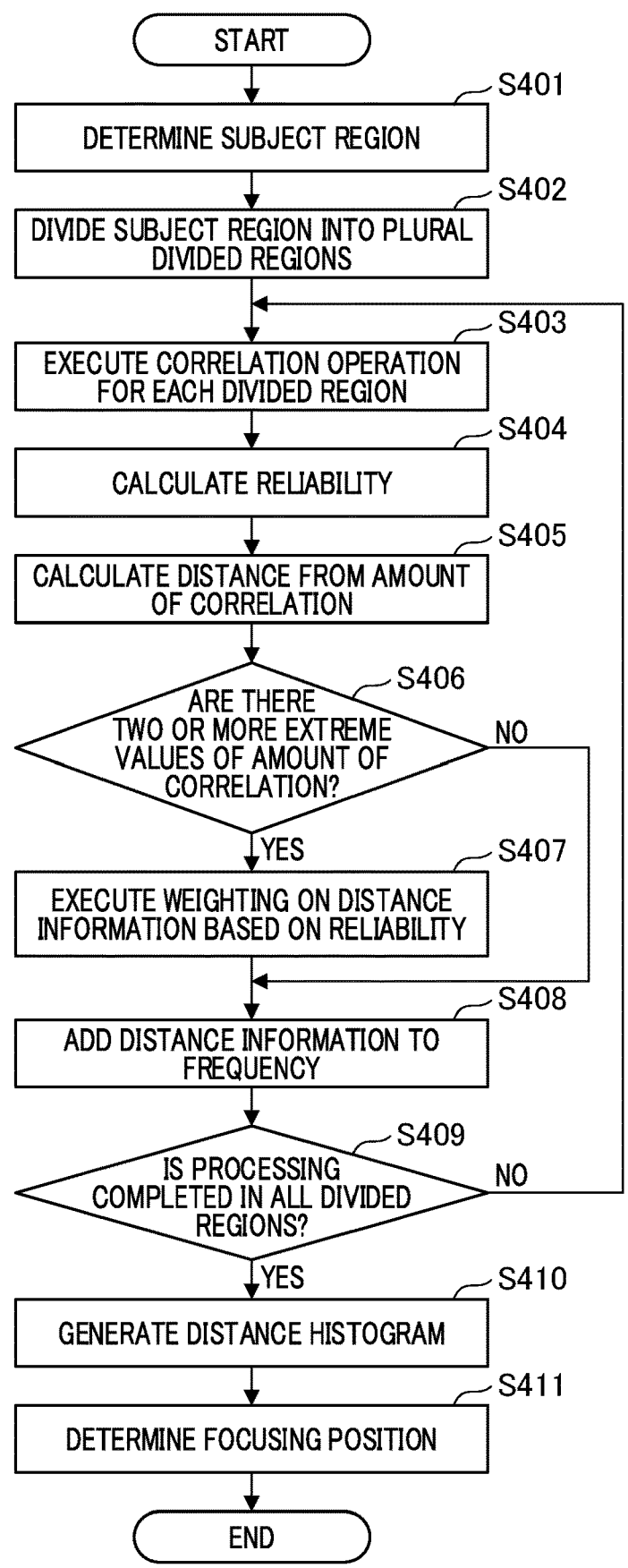
FIG. 7 is a flow chart illustrating operations of the imaging device.

Next, a process of determining a focusing position in the imaging device 100 will be described with reference to FIGS. 7 to 10B. Processing shown in the flow chart of FIG. 7 is started by a user pressing a predetermined switch (for example, a first switch SW1 constituting a release switch). A CPU of the system control unit 112 reads out and executes a program stored in a memory to realize the processing shown in FIG. 7.

In S401, the subject selection control unit 105 determines a subject region within a captured image on the basis of an output signal of the imaging element 102. In S402, the subject region division unit 113 divides the subject region within the captured image into a predetermined number of divisions. A specific example will be described with reference to FIG. 8.

Figure 8:
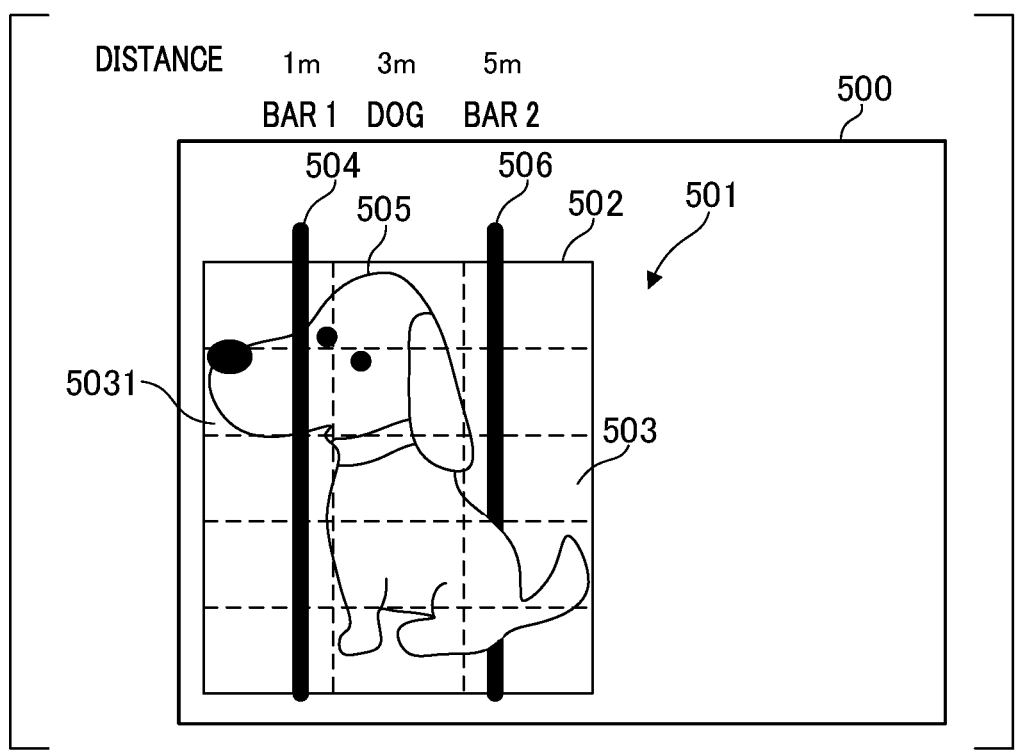
FIG. 8 is a diagram illustrating a subject frame and region division.

FIG. 8 is a schematic diagram illustrating a subject region and divided regions. A captured image 501 within a display screen 500 has an image portion of a dog 505 which is a main subject, a subject frame 502 representing a region in which the dog 505 is present, and image portions of two bars 504 and 506 which are present before and after the dog 505. In addition, as an example, a region 503 divided into 3×5=15 is displayed. As for the distance of each subject, a distance from the imaging optical system to the first bar 504 is set to 1 m, a distance therefrom to the dog 505 is set to 3 in. and a distance therefrom to the second bar 506 is set to 5 m.

In S403 of FIG. 7, the parallax amount calculation unit 106 performs a correlation operation in order to calculate the amount of parallax for each region 5031 divided in S402. In S404, the reliability calculation unit 107 calculates a reliability for the correlation operation result of S403. In S405, the distance calculation unit 114 calculates the amount of defocus from the amount of parallax calculated by the correlation operation, and calculates a distance to the subject using the information of the lens and the diaphragm.

In S406, the parallax amount calculation unit 106 determines whether there are two or more extreme values of the amount of correlation, to proceed to the process of S407 if there are two or more extreme values of the amount of correlation and to proceed to the process of S408 if there is one or less. The extreme value of the amount of correlation is a correlation value in the case of the amount of shift in which the extremity of a change in the amount of correlation is given. If the number of extreme values of the amount of correlation is one or zero, the number of distance information obtained from the divided region 503 is one or less. In this case, it is not necessary to perform a weighting operation on the distance information.

In S407, the distance calculation unit 114 performs the weighting operation on the distance information on the basis of the reliability calculated in S404. If there are two or more extreme values of the amount of correlation within the divided region 503, it is estimated that a plurality of subjects are present. In a method of the related art of calculating a distance histogram, only one piece of distance information is handled for one region. Therefore, when a plurality of subjects are present in the region, a plurality of pieces of distance information cannot be reflected in the distance histogram. On the other hand, by performing weighted addition based on weighting in the present embodiment, it is possible to reflect a plurality of pieces of distance information in the distance histogram and to improve the accuracy of the distance histogram. Meanwhile, in order to avoid the presence of a plurality of subjects in the divided region, there is a method of reducing the size of the divided region. However, due to the accuracy of the correlation operation for calculating the distance information in the divided region, it is difficult to make the size of the divided region equal to or less than a predetermined value.

Figure 9A:
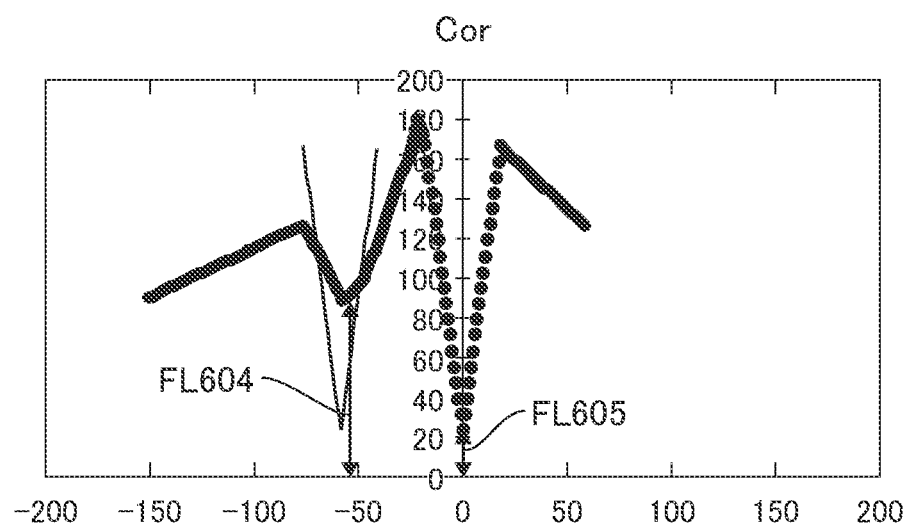
FIGS. 9A to 9C are diagrams illustrating reliability evaluation values of the amount of correlation.
Figure 9B:
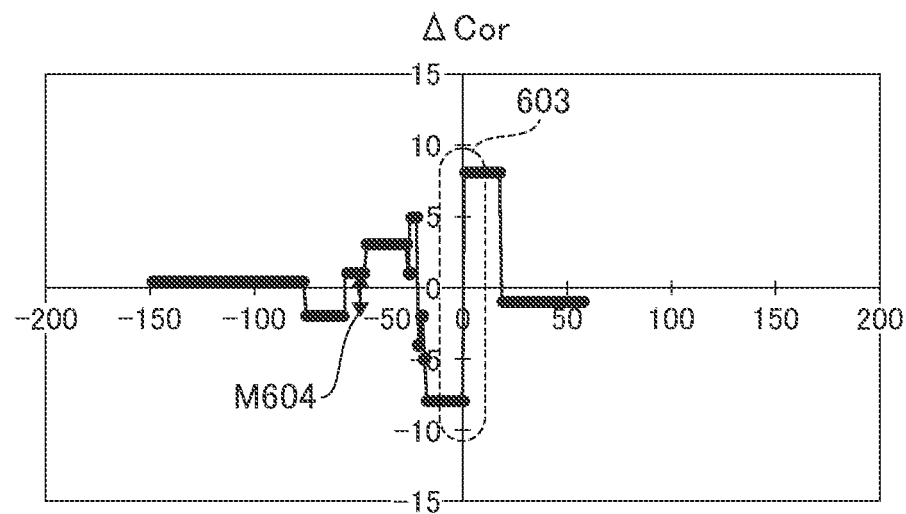
Figure 9C:
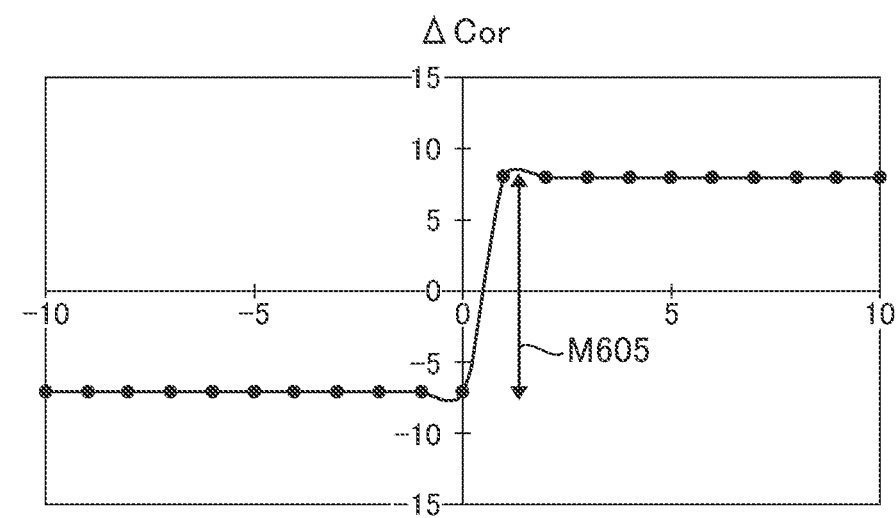

Reliability evaluation values of the amount of correlation in the divided region 5031 (FIG. 8) will be described with reference to FIGS. 9A to 9C. FIG. 9A is a graph obtained by plotting a correlation operation result of the divided region 5031. The horizontal axis represents the number of shifts, and the vertical axis represents a correlation operation result (the amount of correlation: Cor). In FIG. 9A, an example of the extreme value of the amount of correlation is shown as the reliability, and there are two extreme values of the amount of correlation. A smaller amount of correlation and a larger extreme value of the amount of correlation indicate a higher reliability. The left extreme value (correlation amount FL604) corresponds to the dog 505, and the right extreme value (correlation amount FL605) corresponds to the bar 504. The weighting operation is performed on the basis of the extreme value of the amount of correlation, and a corrected correlation amount Cor504 corresponding to the dog 505 is obtained in the following Expression (1). In addition, a corrected correlation amount Cor505 corresponding to the bar 504 is obtained in the following Expression (2).

$$Cor504 = 1 - (FL604/(FL604+FL605)) \qquad (1)$$

$$Cor505 = 1 - (FL605/(FL604+FL605)) \qquad (2)$$

In Expressions (1) and (2), weighting is performed on the basis of the ratio of FL604 and FL605 to the sum "FL604+FL605."

Generally, a person or an animal having a tendency to be selected as a main subject tends to have a lower contrast and a smaller extreme value of the amount of correlation than an obstacle (sub-subject) such as a bar. For this reason, in a method of selecting the distance information with the magnitude of the extreme value of the amount of correlation alone, only the bar 504 having a large extreme value of the amount of correlation is selected, and as a result, the distance information of the dog 505 is lost. On the other hand, in the present embodiment, the weighting operation is performed on the basis of the extreme value of the amount of correlation that is a correlation value in the case of the amount of shift in which the extremity of a change in the amount of correlation is given, and thus it is possible to increase the number of samplings of the distance histogram.

A method of performing a weighting operation based on the degree of steepness of a change in the amount of correlation which is one reliability will be described with reference to FIGS. 9B and 9C. FIG. 9B is a graph obtained by plotting the amount of change in the amount of correlation. The horizontal axis represents the number of shifts, and the vertical axis represents the amount of change ΔCor in the amount of correlation. The enlarged view of a dotted line portion 603 in FIG. 9B is FIG. 9C. The difference value of ΔCor at two points before and after ΔCor switches between positive and negative and traverses zero is referred to as the degree of steepness of a change in the amount of correlation. A large degree of steepness makes it possible to perform more accurate focus detection. The degree of steepness corresponding to the dog 505 is shown as M604, and the degree of steepness corresponding to the bar 504 is shown as M605. Regarding M604 and M605, the weighting calculation is performed by M604/(M604+M605) and M605/(M604+M605).

In S408 of FIG. 7, the distance histogram generation unit 108 adds the distance information to the frequency. In S409, a process of determining whether the processing is completed in all the divided regions is performed. If the processing is not completed in all the divided regions, the flow returns to S403 and the processing is continued. In addition, if the processing is completed in all the divided regions, the flow proceeds to the process of S410.

Figure 10A:
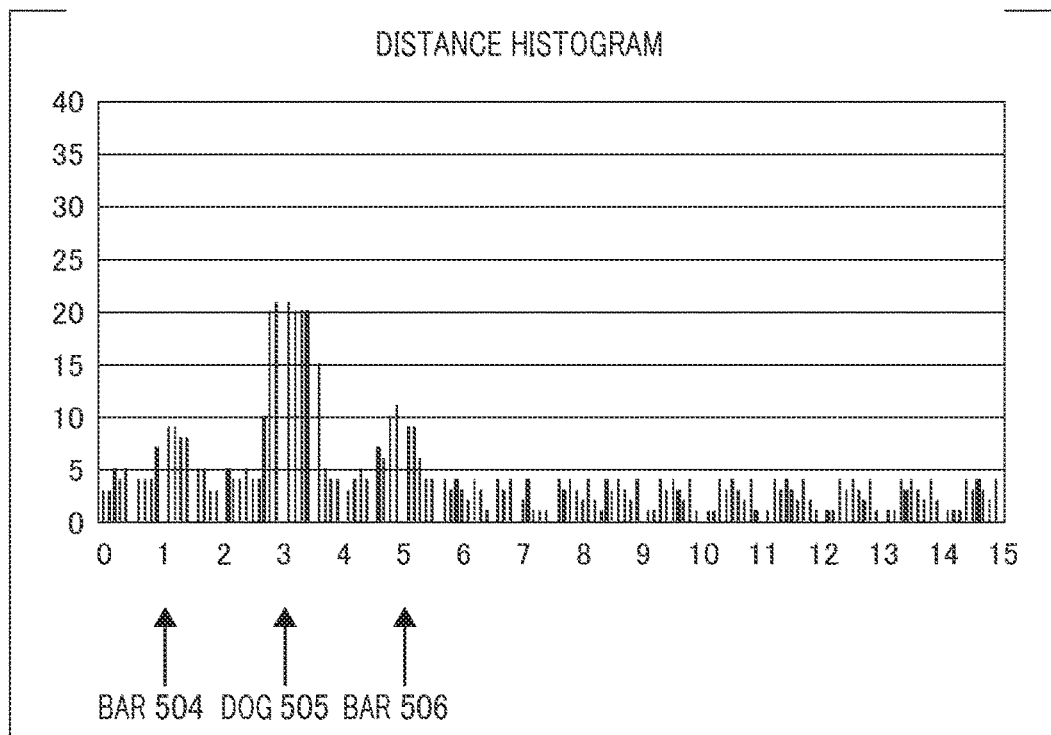
FIGS. 10A and 10B are diagrams illustrating examples of distance histograms.
Figure 10B:
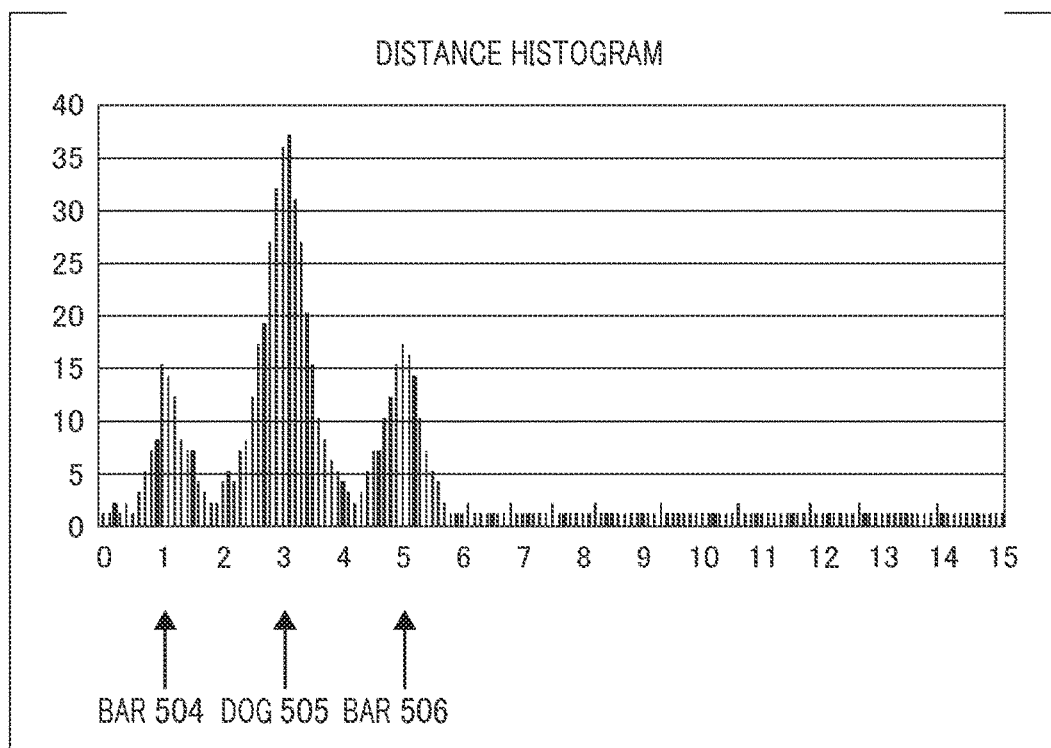

In S410, the distance histogram generation unit 108 generates a distance histogram representing the frequency distribution of the distance information. FIGS. 10A and 10B show examples of distance histograms related to a subject region. The horizontal axis represents a distance, and the vertical axis represents the frequency of each distance. FIG. 10A shows a distance histogram in a case where weighting related to the distance information is not performed as a comparative example. FIG. 10B shows a distance histogram in a case where weighting related to the distance information is performed. In FIG. 10B, the number of distance information obtained from one divided region increases as compared with FIG. 10A, and thus it is easy to distinguish the peaks of frequencies at the distances of the bar 504, the dog 505, and the bar 506 which are subjects.

In S411 of FIG. 7, the focus control unit 104 and the system control unit 112 determines a focusing position on the basis of the generated distance histogram, and performs driving control of the focus lens according to the focusing position through the lens control unit 109 so as to focus on the main subject. A method of determining a focusing position, a process of selecting a subject distance with the highest frequency peak in the distance histogram is performed. In addition, since the subject region is often determined centering on the subject, a process of selecting a distance closest to the center distance of the subject region may be performed. In the present embodiment, the peaks of a distance histogram representing a frequency distribution can be distinguished with a high level of accuracy, and thus it is possible to obtain a focusing position more accurately than in the related art.

According to the present embodiment, by performing a weighting operation on the distance information obtained from a region divided in the subject region, it is possible to increase the number of samplings of the distance information and to calculate a more accurate distance histogram.

In a case where the frequency of the distance information is added, there is a method in which the distance histogram generation unit 108 adds the amount of parallax of which the reliability is larger than the first threshold Th113 to the frequency without performing weighting. In this method, a distance having a high reliability is easily selected by further increasing the frequency of distance information of which the reliability is relatively high. In addition, there is a method in which the addition of a frequency is not performed on the amount of parallax of which the reliability is smaller than the second threshold Th114. That is, a distance having a high reliability is easily selected by further lowering the frequency of distance information having a low reliability.

There is a method of not generating a distance histogram if the area of the subject region is small and the number of divisions of the subject region division unit 113 is smaller than the third threshold Th115. Since the size of the subject region is small if the number of divisions of the subject region division unit 113 is less than the third threshold, there is a high possibility of only a single piece of distance information being present. In this case, for example, a focusing position corresponding to the center distance of the subject region is determined. Since a distance histogram operation can be omitted, it is possible to shorten a processing time.

Second Embodiment

Next, a second embodiment of the present invention will be described. In the present embodiment, a process for a user to designate a focusing position in order to avoid unintended focusing on a subject will be described. In the present embodiment, the same elements as those in the first embodiment will not be described in detail by the already used reference numerals and signs or the like being applied thereto, and differences will be mainly described.

Figure 11:
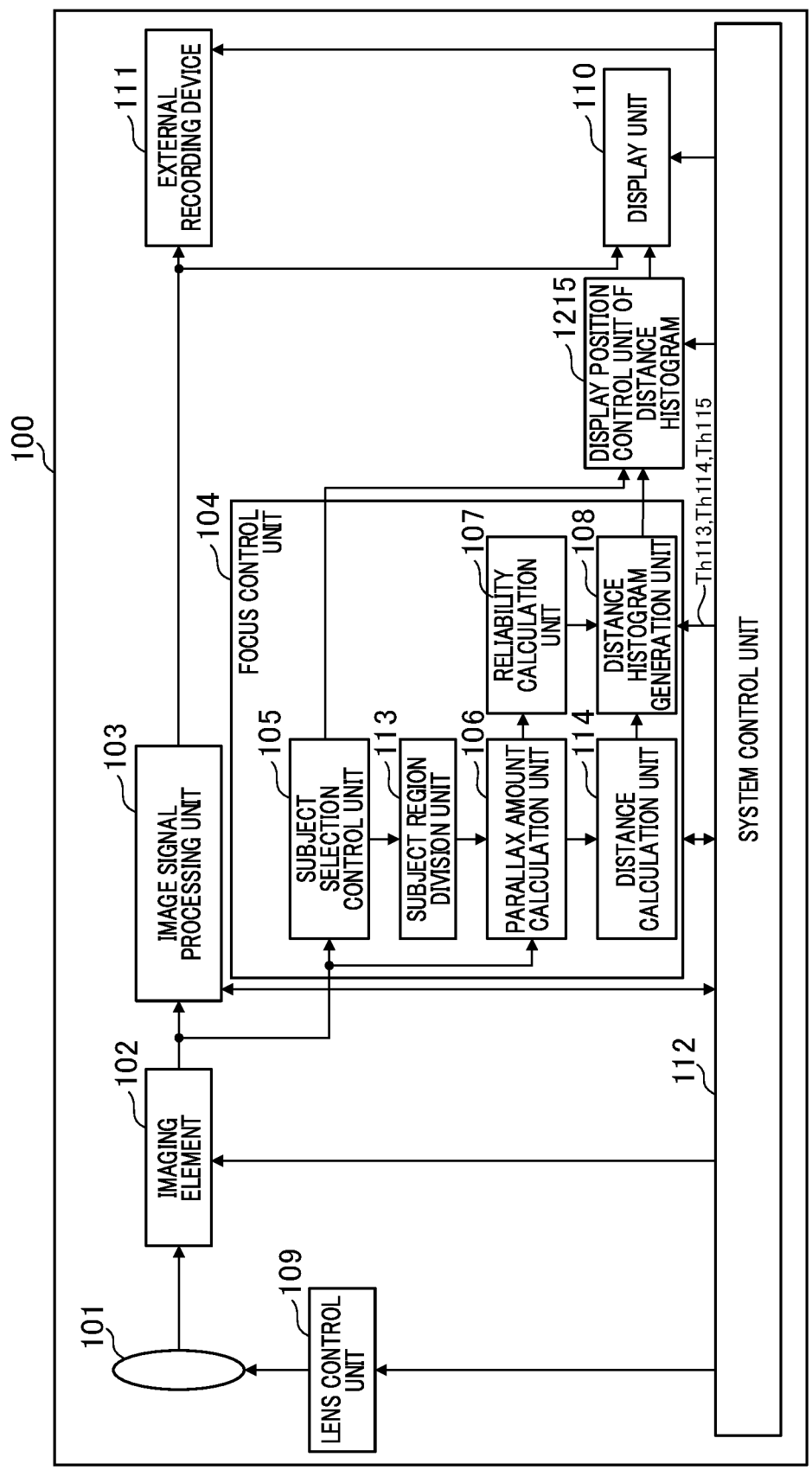
FIG. 11 is a block diagram illustrating a configuration of an imaging device in a second embodiment.

FIG. 11 is a block diagram illustrating a configuration of the imaging device 100 of the present embodiment. A difference from FIG. 1 is that a display position control unit 1215 of a distance histogram is added in FIG. 11. The display position control unit 1215 determines a position at which the generated distance histogram is displayed on the screen of the display unit 110 on the basis of an output of the subject selection control unit 105 and an output of the distance histogram generation unit 108. In addition, the display unit 110 has a touch panel-type display device, and a user can designate the position of a subject intended to be in focus by a touch operation.

Figure 12:
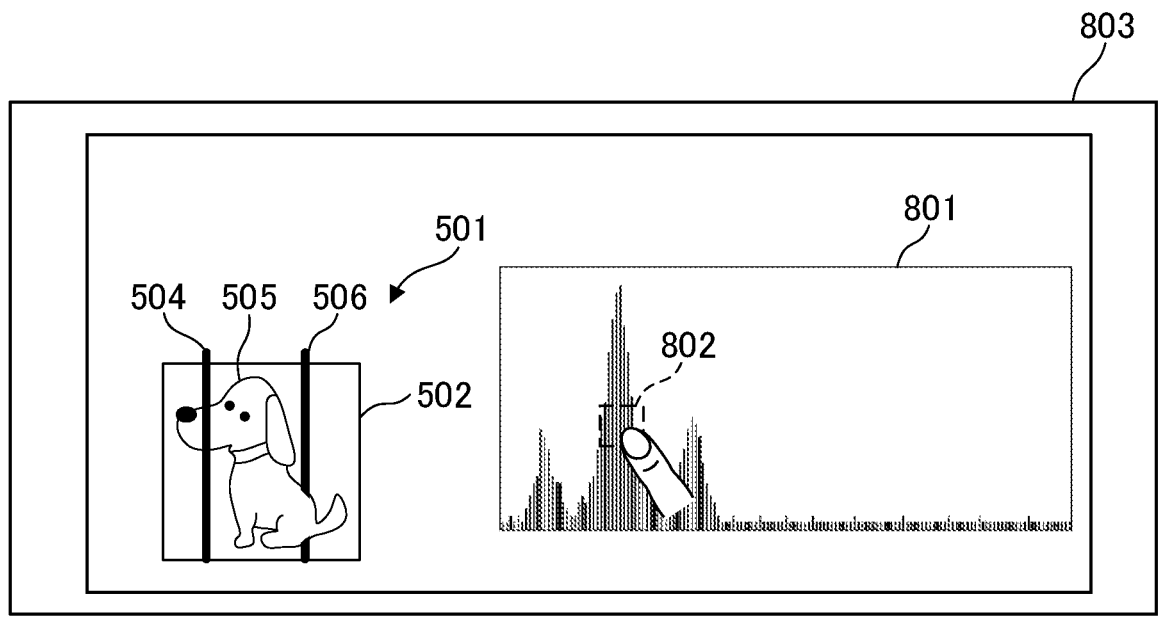
FIG. 12 is a diagram illustrating a touch operation for determining an AF point in the second embodiment.

FIG. 12 shows an example of a display screen 803 of the display unit 110 of the present embodiment. A distance histogram 801 in the subject region generated by the distance histogram generation unit 108 is displayed on the display screen 803 in addition to the captured image 501. If the user touches the peak position of the distance histogram, a focusing position corresponding to a corresponding distance can be focused.

In FIG. 12, if the user touches a position 802 with his/her finger, a distance where the dog 505 which is a main subject is present is selected, and the lens control unit 109 drives and controls a focus lens in accordance with a focusing position corresponding to a corresponding distance. If the user designates a focusing position through a touch operation, for example, when the size of the subject region within the displayed image is small, or when another subject is present before and after the subject, an unintended touch operation can cause another subject to be in focus. In order to avoid this, there is a method of enlarging the displayed image through an enlargement operation using two fingers. However, it is difficult for the user to perform a multi-touch operation while holding the imaging device during image capturing, and it takes time and effort to set an AF point (focus state detection point) at a desired subject position. In the present embodiment, in the displayed distance histogram, the focusing position can be determined by touching a desired peak position. Thus, it is possible to reduce a possibility of a focusing position based on an erroneous touch operation being determined.

Figure 13:
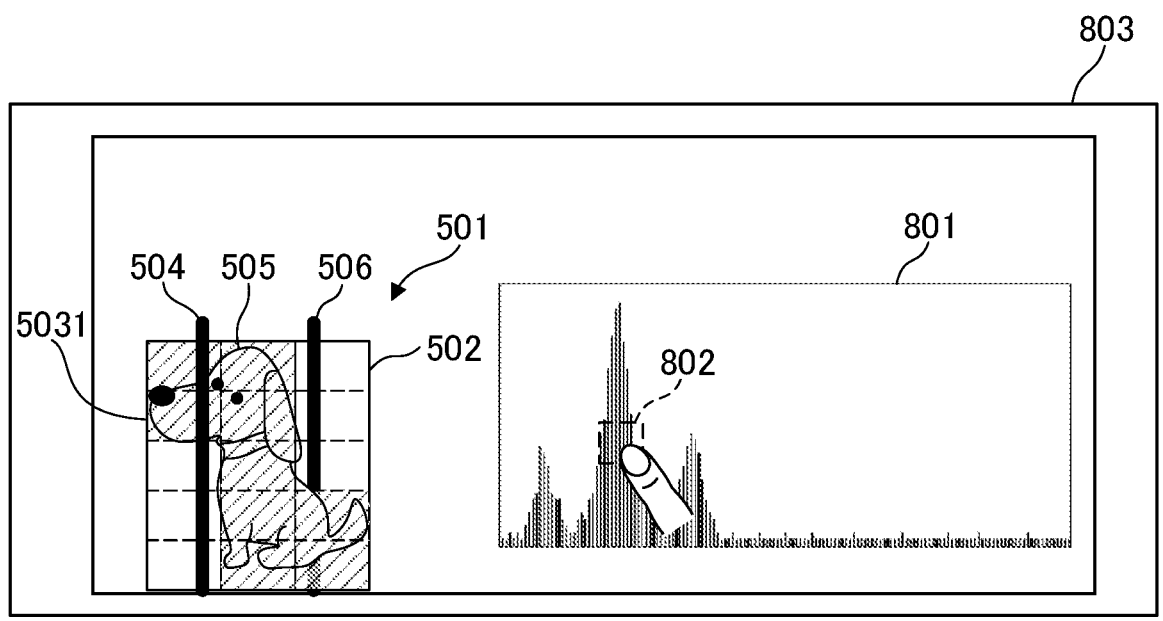
FIG. 13 is a diagram illustrating highlight display in the second embodiment.

Reference will be made to FIG. 13 to describe a process of highlighting the divided region 503 in which distance information corresponding to a peak position touched by the user in a displayed distance histogram is output. In FIG. 13, the divided region 503 in which corresponding distance information is output is highlighted by touching the position 802. The user has a tendency to understand which region of the subject region is focused on. For example, highlight display is performed in a case where a ratio at which distance information at a touched position is output among the distance information output from the divided regions is a predetermined value. Alternatively, highlight display of divided regions including distance information other than the distance information at the touched position is not performed.

The display position of the distance histogram 801 is set at a position where the subject frame 502 is not displayed. That is, the display position control unit 1215 of the distance histogram 801 determines the display position and size of the distance histogram 801 on the basis of the display position of the subject frame 502.

In the present embodiment, since the generated distance histogram is displayed on a screen and a focusing position is determined by touching the peak position of the distance histogram, it is possible to reduce a possibility of a focusing position which is not intended by a user being determined, and to realize the improvement of usability.

The distance histograms need not always to be displayed on a screen. For example, if the size of the subject region is larger than a fourth threshold, the distance histogram 801 is not displayed on a screen. if the size of the main subject image is larger than the fourth threshold, there is a low possibility of the user erroneously touching a region corresponding to the subject other than the main subject. Thus, it is possible to determine a focusing position by touching the main subject region without displaying the distance histogram 801.

Although highlight display has been described as an example of highlighting in the present embodiment, there is no limitation thereto, and various display processes (change of brightness, hue, or the like) can be performed in order to identifiably display the divided region.

While preferred embodiments of the present invention have been described and illustrated above, the present invention is not limited to the embodiments, and can be modified and changed within the scope of the invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and ma include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-016300, filed Feb. 3, 2020, which is hereby incorporated by reference wherein in its entirety.

What is claimed is:

1. An image processing device comprising
    at least one processor and a memory holding a program which makes the processor function as:
    an acquisition unit configured to acquire a plurality of image signals having different viewpoints;
    a division unit configured to divide a region within an image into a plurality of regions;
    a parallax amount calculation unit configured to calculate an amount of parallax by performing a correlation operation of the plurality of image signals with respect to a plurality of divided regions divided by the division unit;
    a distance calculation unit configured to calculate distance information of a subject based on the amount of parallax;
    a reliability calculation unit configured to calculate a reliability which is an index for the distance information in the correlation operation; and
    a generation unit configured to generate a histogram representing a frequency distribution of the distance information,
    wherein, if a plurality of pieces of the distance information are present in the divided regions, the generation unit generates the histogram using the plurality of pieces of distance information and the reliability.

2. The image processing device according to claim 1, wherein the generation unit generates the histogram by performing a weighting operation using the reliability and accumulating a frequency of the distance information corresponding to a result of the weighting operation.

3. The image processing device according to claim 2, wherein the generation unit adds the distance information when the reliability is larger than a first threshold to a frequency of the histogram, or does not add the distance information when the reliability is smaller than a second threshold to the frequency of the histogram.

4. The image processing device according to claim 1, wherein the reliability is a degree of steepness of a change in an amount of correlation in the correlation operation or an extreme value which is obtained by the correlation operation.

5. The image processing device according to claim 1, wherein the processor further functions as a selection unit configured to select a subject region within an image, and
wherein the division unit divides the selected subject region into a plurality of regions.

6. The image processing device according to claim 5, wherein, if a size of the subject region is smaller than a third threshold, the generation unit does not generate the histogram.

7. The image processing device according to claim 1, wherein the processor further functions as:
a display unit configured to display the histogram generated by the generation unit; and
a designation unit configured to designate a position corresponding to a subject to be focused on the histogram displayed by the display unit.

8. The image processing device according to claim 7, wherein the display unit displays the histogram at a position different from a subject region within a displayed image.

9. The image processing device according to claim 8, wherein, if a size of the subject region is larger than a fourth threshold, the display unit does not display the histogram.

10. The image processing device according to claim 7, wherein the display unit identifiably displays a region out of a plurality of the divided regions in which the distance information corresponding to a position of the histogram designated by the designation unit is calculated.

11. An imaging device comprising:
an imaging optical system;
an imaging element;
at least one processor and a memory holding a program which makes the processor function as:
an acquisition unit configured to acquire a plurality of image signals having different viewpoints,
a division unit configured to divide a region within an image into a plurality of regions,
a parallax amount calculation unit configured to calculate an amount of parallax by performing a correlation operation of the plurality of image signals with respect to a plurality of divided regions divided by the division unit,
a distance calculation unit configured to calculate distance information of a subject based on the amount of parallax,
a reliability calculation unit configured to calculate a reliability which is an index for the distance information in the correlation operation,
a generation unit configured to generate a histogram representing a frequency distribution of the distance information, and
a control unit configured to perform focus adjustment control on the imaging optical system using focus detection information acquired by the parallax amount calculation unit,
wherein, if a plurality of pieces of the distance information are present in the divided regions, the generation unit generates the histogram using the plurality of pieces of distance information and the reliability.

12. The imaging device according to claim 11, wherein the imaging element includes a plurality of microlenses and a plurality of photoelectric conversion units corresponding to each of the microlenses, and
the acquisition unit acquires the plurality of image signals from the plurality of photoelectric conversion units.

13. A control method which is executed in an image processing device that acquires and processes a plurality of image signals having different viewpoints, the method comprising:
dividing a region within an image into a plurality of regions;
calculating an amount of parallax by performing a correlation operation of the plurality of image signals with respect to a plurality of divided regions divided in the dividing;
calculating distance information of a subject based on the amount of parallax;
calculating a reliability which is an index for the distance information in the correlation operation; and
generating a histogram representing a frequency distribution of the distance information,
wherein the generating includes, if a plurality of pieces of the distance information are present in the divided region, generating the histogram using the plurality of pieces of distance information and the reliability.

14. A non-transitory recording medium storing a control program of an image processing device that acquires and processes a plurality of image signals having different viewpoints causing a computer to perform each step of a control method of the image processing device, the method comprising:
dividing a region within an image into a plurality of regions;
calculating an amount of parallax by performing a correlation operation of the plurality of image signals with respect to a plurality of divided regions divided in the dividing;
calculating distance information of a subject based on the amount of parallax;
calculating a reliability which is an index for the distance information in the correlation operation; and
generating a histogram representing a frequency distribution of the distance information,
wherein the generating includes, if a plurality of pieces of the distance information are present in the divided region, generating the histogram using the plurality of pieces of distance information and the reliability.

* * * * *